United States Patent [19]
Auer

[11] 4,282,419
[45] Aug. 4, 1981

[54] CONSUMABLE ELECTRODE WELDING TORCH WITH POLYGONAL CONTOURED ELECTRODE GUIDE

[75] Inventor: Rupert Auer, Eching, Fed. Rep. of Germany

[73] Assignee: Messer Griesheim GmbH, Frankfurt am Main, Fed. Rep. of Germany

[21] Appl. No.: 13,516

[22] Filed: Feb. 21, 1979

[30] Foreign Application Priority Data

Feb. 23, 1978 [DE] Fed. Rep. of Germany ....... 2807686

[51] Int. Cl.³ .......................... B23K 9/28; B23K 9/16
[52] U.S. Cl. .......................... 219/137.44; 219/137.61; 219/74; 279/51
[58] Field of Search ...................... 219/74, 75, 137.44, 219/137.51, 137.52, 137.61, 137.2; 279/42, 48, 51, 52, 56, 59

[56] References Cited

U.S. PATENT DOCUMENTS

| 172,689 | 1/1876 | Barrett | 279/59 |
| 4,057,704 | 11/1977 | Geus et al. | 219/137.62 X |
| 4,087,195 | 5/1978 | Wood | 279/42 X |
| 4,158,763 | 6/1979 | Moerke | 219/137.44 X |

FOREIGN PATENT DOCUMENTS

848544 9/1960 United Kingdom ............... 219/137.44

Primary Examiner—C. L. Albritton
Assistant Examiner—Keith E. George
Attorney, Agent, or Firm—Ernest F. Marmorek

[57] ABSTRACT

A welding torch for arc welding includes a housing, a contact tube having a polygonal cross-section disposed in the housing, and a securing device for replaceably securing the contact tube within the housing.

2 Claims, 3 Drawing Figures

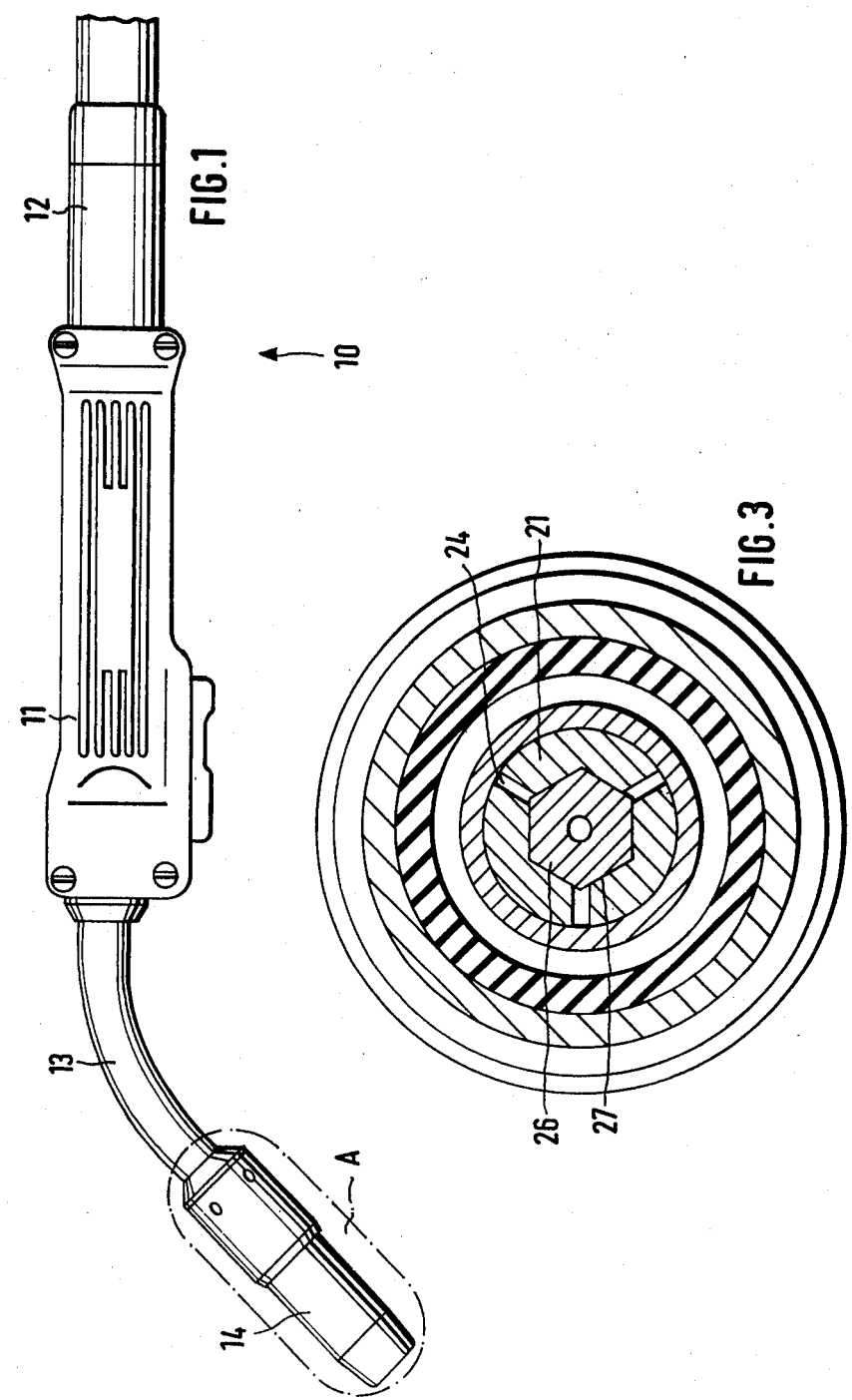

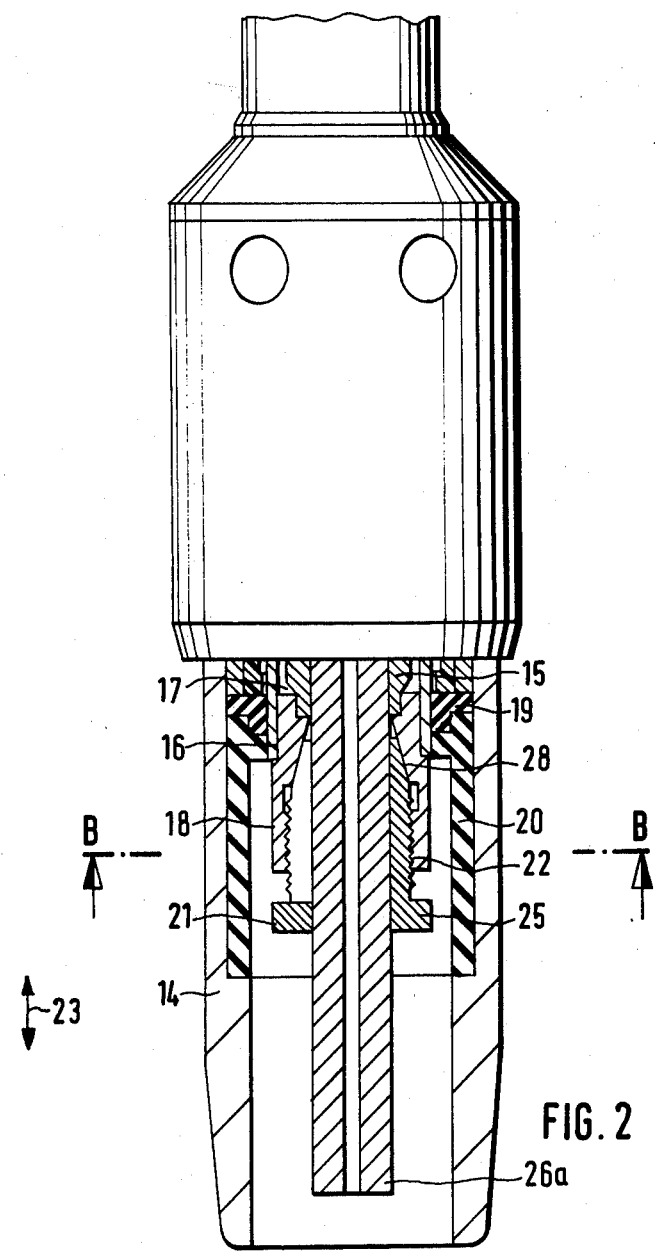

CONSUMABLE ELECTRODE WELDING TORCH WITH POLYGONAL CONTOURED ELECTRODE GUIDE

CROSS-REFERENCE TO OTHER APPLICATIONS

Reference should also be made to the application entitled "A gas welding torch including a consumable electrode for arc welding", filed on Feb. 21, 1979 concurrently with the present application, and assigned Ser. No. 13,515 to the assignee of the present invention.

BACKGROUND OF THE INVENTION

From German Patent No. DE-OS 19 24 002, there is known a welding torch, including a consumable electrode for arc welding, which includes a housing and a collet for a contact tube free of any thread. In the known torch, a threadless contact tube is fabricated from a tube having a circular contour, which is surrounded by a collet, which collet is in turn operatively secured to a housing for the collet. The housing for the collet is mechanically rigid with a gas nozzle, which gas nozzle is in turn connected by means of a thread to a pipe end by rotation of the gas nozzle, so that the contact tube is firmly clamped to the collet housing. A contact tube, free of any thread, is advantageous as far as manufacture and replacement of the contact tube is concerned, compared to devices of the prior art. The complicated arrangement of the housing for the collet, as well as the inadequate dissipation of heat from the contact tube, is disadvantageous, however.

In torches of the prior art, contact between the contact tube and the collet is maintained only through a few circumferential contact lines between the collet and the tube, so that any heat exchange from the contact tube to the pipe end of the torch can only be achieved through these few contact lines.

SUMMARY OF THE INVENTION

It is an object of the present invention to avoid the aforesaid disadvantages, and devise a welding torch of the above-described kind, in which an attachment or a release of the contact tube can be obtained in the simplest possible fashion, and where, on the other hand, any heat taken up by the contact tube can be dissipated in the shortest possible time by transfer to the cooled pipe end of the torch.

This object is achieved, according to the present invention, by providing a welding torch including a housing, a threadless contact tube disposed in the housing and having an external polygonal contour, and securing means, including a first member in frictional engagement with a large surface thereof with the contact tube, steplessly adjustable therewith, and releasable therefrom, and having an internal contour matching the external polygonal contour of the contact tube, and a second member engageable with a portion of the first member, the portion of the first member being able to be wedged into a portion of the second member, so that quick operative heat dissipation from the contact tube is promoted.

It is advantageous if the second member is formed with a first thread on an interior portion thereof, and the first member is formed with a second thread on an exterior portion thereof, the first thread mating with said second thread.

It is preferable if the polygonal contour is a hexagonal contour.

By the proposed implementation of the contact tube having a polygonal contour, and together with the appropriately formed mating collet, the collet is made to abut a relatively large circumferential surface of the contact tube; the heat taken up by the contact tube can therefore be dissipated or transferred through a surface to the remaining parts of the welding torch which is larger than a surface of a contact tube of circular contour cooperating with a round collet. Furthermore, the method of securing the collet to the collet housing by means of a thread, and the polygonal contour of the contact tube, permits the contact tube to be clamped to, or released from, the collet housing in the simplest possible manner.

The present invention therefore makes it possible, by using a wrench mating with the polygonal contour of the collet tube, to rotate the latter as desired. The collet may be secured to a housing by screwing it thereinto, and the contact tube may be correspondingly clamped thereinto, or released therefrom. It is preferable if the polygonal contour of the contact tube is a hexagonal contour. In this manner, it is advantageously possible to use a hexagonal wrench which is commercially available for release or attachment of the contact tube to the welding torch. As a result of making it possible to insert the wrench at the free end of the contact tube, when desiring to exchange a contact tube, the gas nozzle no longer needs to be released from the pipe, or removed therefrom

BRIEF DESCRIPTION OF THE DRAWINGS

For a fuller understanding of the nature and objects of the present invention, reference should be had to the following detailed description, taken in connection with the accompanying drawings, in which:

FIG. 1 shows a schematic representation of the welding torch in elevation;

FIG. 2 shows a detail "A" in partial cross-section; and

FIG. 3 is a section along the line B—B of FIG. 2.

DESCRIPTION OF THE PREFERRED EMBODIMENTS

Referring now to the drawings, a welding torch for arc welding, including a consumable electrode, is generally denoted by the reference numeral 10. The torch 10 includes a handle 11, consisting of two semi-circular shells, to one end of which there is attached a hose 12, and to the other end of which there is secured a pipe 13. A gas nozzle 14 is disposed at the end of the pipe 13.

As can be seen from FIG. 2, there are disposed at one pipe end two concentric tubes 15 and 16, which serve on the one hand for the supply of current and gas, and on the other hand, form a conduit 17 for circulating cooled liquid therein. The ends of the tubes 15 and 16 are mechanically rigid with a collet housing 18, soldered thereonto. The insulations 19 and 20 avoid an electrical connection between the tubes 15 and 16, and the gas nozzle 14.

According to the present invention, a collet 21 may be displaced in opposite directions within the collet housing 18, by means of a thread 22, as shown by the arrow 23. As can be seen from FIG. 3, the collet 21 has three or more gas slits 24, which terminate on a collar 25 of the collet 21. The contact tube 26 is implemented with a polygonal contour, which is preferably a hexagonal contour, as shown in FIG. 3.

The collet 21 has an opening 27 with a polygonal contour, which in the implementation shown is a hexagonal contour. This polygonal implementation, as particularly shown in FIG. 3, results in a relatively large contact surface between the contact tube and the collet, so as to promote heat transfer or heat dissipation, from the contact tube to the collet.

In order to release or secure a contact tube having a polygonal profile to, or from, the welding torch, it is only necessary to insert the contact tube formed with a polygonal contour into the collet opening mating with the polygonal tube contour, and then to rotate the contact tube, and therefore the collar 25 of the collet 21, in a direction so as to insure clamping of the tube; the housing, the contact tube, and the collet, are then clamped to one another through the conical surface 28.

As has already been described, an appropriate wrench, such as a hexagonal wrench, or the like, can therefore be operatively used in the simplest manner and fashion near the end 26a of the contact tube, so that on one hand, a release of the gas nozzle 14 from the welding torch is unnecessary, and on the other hand, the mechanical stress on the collar 25 is reduced by avoiding the use of a tool stressing the collar 25 of the collet 21.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A welding torch for arc welding, including a consumable electrode,
   comprising in combination:
   a housing formed with a first thread on an interior portion thereof,
   a threadless contact tube disposed in said housing and having an external polygonal contour, and
   securing means, including
   a first member formed with a second thread on an exterior portion thereof, said first thread mating with said second thread, said first member having a large surface in frictional engagement with said contact tube, and being steplessly adjustable therewith, and releasable therefrom, and having an internal contour matching the external polygonal contour of said contact tube,
   a portion of said first member, being able to be wedged into a portion of said housing, whereby quick operative heat dissipation from the contact tube is promoted.

2. A welding torch as claimed in claim 1, wherein the polygonal contour is a hexagonal contour.

* * * * *